May 20, 1952 W. W. K. VAN NORT 2,597,551
WEED GUARD FOR OUTBOARD MOTORS
Filed March 24, 1950 2 SHEETS—SHEET 1
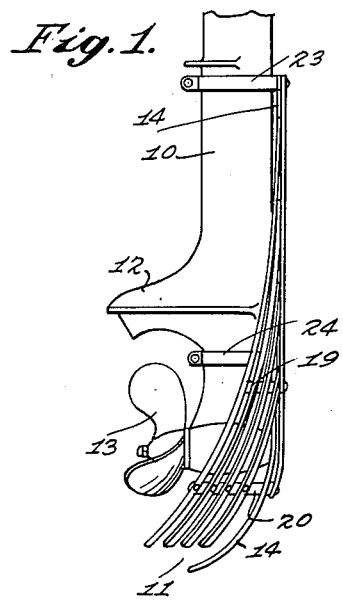
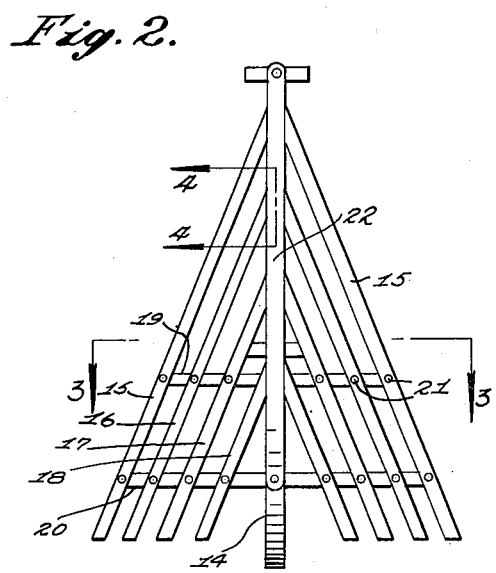
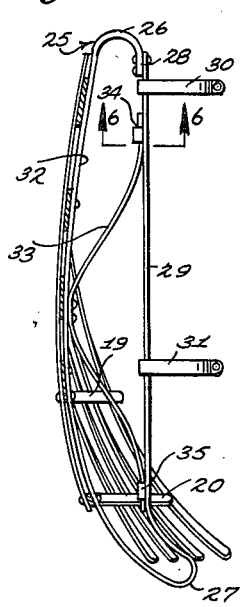
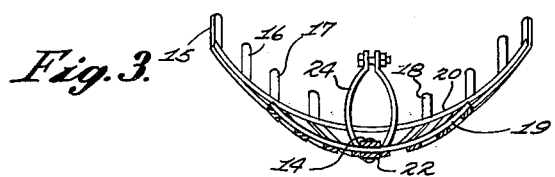
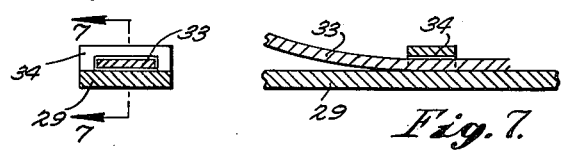
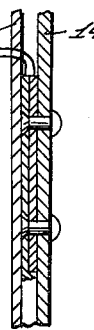
INVENTOR.
WILLIAM W. K. VAN NORT
BY
McMorrow, Berman + Davidson
ATTORNEYS Patented May 20, 1952

2,597,551

UNITED STATES PATENT OFFICE 2,597,551

WEED GUARD FOR OUTBOARD MOTORS

William W. K. Van Nort, Cabin John, Md.;
Catherine H. Van Nort executrix of said William
W. K. Van Nort, deceased Application March 24, 1950, Serial No. 151,611

1 Claim. (Cl. 115—42)

This invention relates to weed guards for outboard boat motors and constitutes a continuation-in-part of my Patent No. 2,559,179 patented July 3, 1951, for Outboard Engine Guard.

It is among the objects of the present invention to provide an improved weed guard assembly in which the weed guard may be mounted directly on the lower portion of the motor stem or may be mounted on the motor through the intermediacy of a resilient frame, which is disposed in the path of the propeller of the outboard motor and extends to the opposite sides of the propeller a distance sufficient to prevent weeds or grass from fouling the propeller, which effectively moves such material as weeds and grass out of the path of the propeller but passes easily through the water and does not create any large amount of drag, which is easy to attach to and detach from a motor, and which is simple and durable in construction, economical to manufacture, and of light weight construction.

Other objects and advantages will become apparent from a consideration of the following description and the appended claim in conjunction with the accompaying drawings wherein:

Figure 1 is a side elevational view of an outboard motor stem with a weed guard illustrative of the invention operatively applied thereto;

Figure 2 is a front elevational view of the weed guard illustrated in Figure 1;

Figure 3 is a transverse cross sectional view on the line 3—3 of Figure 2;

Figure 4 is a cross sectional view on an enlarged scale on the line 4—4 of Figure 2;

Figure 5 is a longitudinal cross sectional view of a weed guard and supporting frame assembly;

Figure 6 is a transverse cross sectional view on the line 6—6 of Figure 5;

Figure 7 is a cross sectional view on the line 7—7 of Figure 6;

Figure 8:
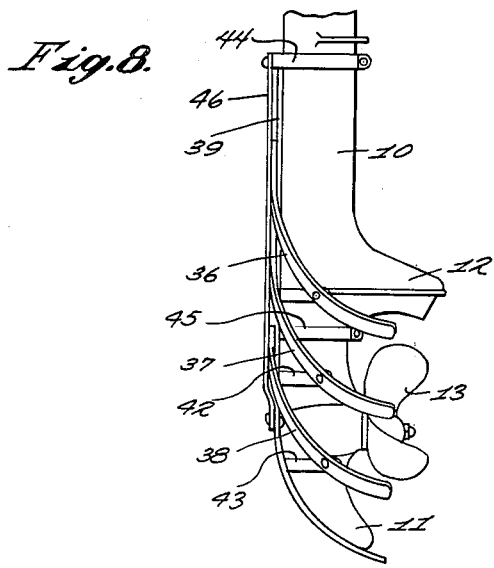
Figure 8 is a side elevational view of an outboard motor stem with a somewhat modified form of weed guard illustrative of the invention operatively applied thereto.
Figure 9:
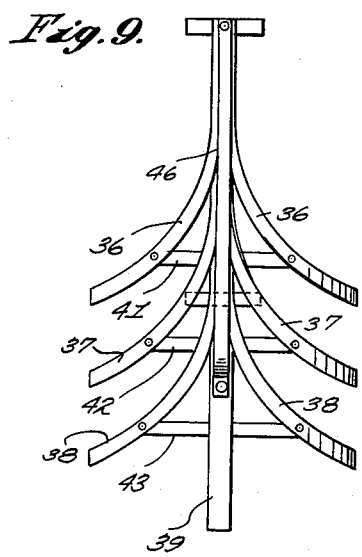
Figure 9 is a front elevational view of the modified form of weed guard illustrative in Figure 8.
Figure 11:
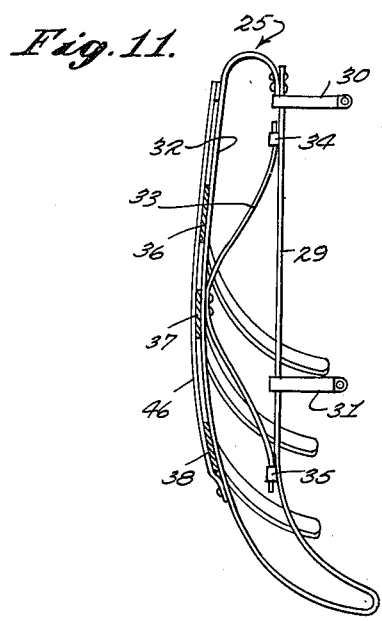
Figure 11 is a longitudinal cross sectional view showing an assembly of the modified form of weed guard and a supporting frame for attaching the weed guard to an outboard motor stem.
Figure 10:
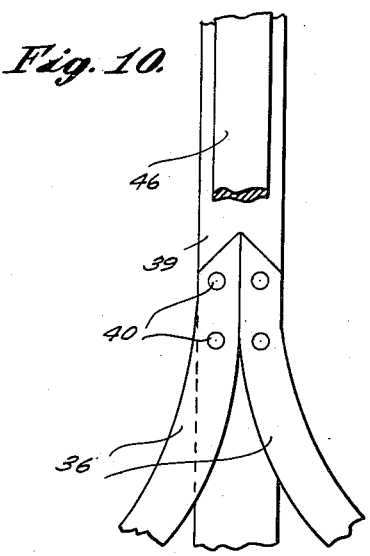
Figure 10 is an elevational view on an enlarged scale of a fragmentary portion of the weed guard illustrated in Figure 9 illustrating structural details of the weed guard.

With continued reference to the drawings, the outboard motor stem illustrated comprises an elongated hollow body 10 of elliptical cross sectional shape having at its lower end a rearwardly curved skeg 11 and having intermediate its length a rearwardly extending step or guard structure 12. The propeller 13 is mounted at the rear side of the stem between the skeg 11 and the step 12 and is driven by suitable mechanism, not illustrated.

The weed guard illustrated in Figures 1 to 4 inclusive comprises an elongated metal bar 14 longitudinally curved to fit the front side of the motor stem 10 and having a length such that it extends substantially from the end of the skeg formation 11 to a position above the step 12. A plurality of elongated metal fingers are secured, each at one end, to the bar 14. These fingers are arranged in pairs of progressively decreasing length from the top toward the bottom end of the bar and the two fingers of each pair of fingers extend longitudinally of the bar from the location at which the fingers are attached toward the lower end of the bar and diverge symmetrically to opposite sides of the bar. In the arrangement illustrated there are four pair of fingers, but this number may be varied if desired without in any way exceeding the scope of the invention.

The two fingers 15 of the longer pair of fingers are connected to the bar 14 near the upper end of this bar and extend downwardly along the bar diverging symmetrically from the respectively opposite sides of the latter. The fingers 16, 17 and 18 of the remaining pairs of fingers are secured to the bar at locations successively spaced from the location of the attachment of the fingers 15 and all of the fingers at the same side of the bar are spaced apart and may be approximately parallel. At their free ends all of the fingers terminate along a common line which extends substantially perpendicular to the bar 14 adjacent the lower end of the bar.

Two braces 19 and 20 are secured to the bar 14 at spaced apart locations along the bar and extend perpendicularly to opposite sides of the bar. These braces are secured to the several fingers at each side of the bar by suitable means such as the rivets or bolts 21. The brace 20 is preferably located near the lower ends of the bar and the fingers to reinforce the lower and wider end portion of the weed guard.

The braces 19 and 20 are longitudinally curved so that they sweep rearwardly at both ends from the bar 14 when the guard is operatively mounted on a motor stem, as illustrated in Figure 1, and the fingers are also longitudinally curved so that they sweep downwardly and rearwardly when the guard is in operative position. The lower ends of the fingers are preferably rounded so that the fingers will pass over obstructions which they may encounter in the water.

The bar 14, the fingers and the braces are preferably formed of a resilient material, such as spring steel, so that, if the guard encounters a solid obstruction, these members will bend sufficiently to permit the guard to pass over the obstruction and will then spring back to their original position.

An elongated metal plate 22 is secured to the bar 14 overlying the intermediate portion of this bar and the portions of the fingers 15, 16, 17 and 18 connected to the bar 14.

Split clamps 23 and 24 may be attached to the bar 14 near the respectively opposite ends of the latter for directly connecting the weed guard to the stem of the motor, as illustrated in Figure 1, or the bar 14 may be attached to or may constitute a component of a resilient frame structure by means of which the guard is attached to the motor stem, as illustrated in Figures 5, 6 and 7.

The resilient frame, generally indicated at 25, comprises an elongated flat spring member formed into a flat loop having rounded upper and lower ends 26 and 27, the ends of the spring member being secured together, as indicated at 28. The inner side 29 of the loop is shaped to fit along the front side of the motor stem 10 including the front side of the skeg formation 11 and split clamps 30 and 31 are secured to this side of the loop at spaced apart locations therealong for attaching the spring frame to the motor stem. The outer side 32 of the loop is longitudinally curved so that its concave side is opposed to the loop side 29, the upper portion of the side 32 being substantially straight and the curvature of this side increasing in a downward direction so that the lower portion of the loop is curved rearwardly to fit around and under the skeg 11 on the lower end of the motor stem.

A flat bowed spring 33 is secured substantially at its mid-length location to the outer side 32 of the frame loop near the mid-length location of such outer side and bears at its ends on the side 29 of the frame loop near the respectively opposite ends of the side 29. Flat eyes or loops 34 and 35 are secured to the frame side 29 near the opposite ends of the latter and slidably receive the respectively opposite ends of the spring 33.

The fingers of the weed guard may be secured directly to the outer side 32 of the spring frame, as illustrated in Figure 5, or may be secured to the bar 14, as illustrated in Figures 2 and 3, and this bar in turn secured to the outer side of the frame loop.

The spring frame 25 provides a resilient mounting for the weed guard so that any impact on the weed guard will be cushioned before being transmitted to the motor stem and the lower portion of the resilient frame effectively protects the lower portion of the motor stem from impact with solid obstructions in the water through which the motor stem passes.

In the arrangement illustrated in Figures 8 to 11 inclusive the construction is generally the same as that illustrated in Figures 1 to 7 inclusive and described above, the resilient frame 25 being substantially identical in both cases so that a further description of this frame is unnecessary for the purposes of the present disclosure.

In the modified form of weed guard the fingers 36, 37 and 38 are attached each at one end to an elongated bar 39 which may be attached directly to the outboard motor stem or the fingers may be attached to the outer side 32 of the spring frame, as described above.

In the modified form of weed guard the fingers are curved in two directions so that when the weed guard is in operative position each finger curves downwardly and outwardly from the bar 39 and also downwardly and rearwardly relative to the motor stem. Instead of the fingers being overlapped at their ends attached to the bar 39 as is the case in the form of the invention illustrated in Figures 1 to 4 inclusive, and particularly shown in Figure 4, the fingers of the modified form of weed guard are mounted with their attached ends in side by side relationship and are secured to the bar 39 by suitable means such as the bolts or rivets 40, as is particularly illustrated in Figure 10. The curved fingers are arranged in pairs with the fingers 36 constituting the upper pair, the fingers 37 constituting an intermediate pair, and the fingers 38 constituting a lower pair of fingers mounted on the bar 39 at spaced apart locations along this bar.

Transverse braces 41, 42 and 43 are secured substantially at their mid-length locations to the bar 39 at spaced apart locations along the bar and the brace 41 is secured at its opposite ends to the fingers 36 intermediate the length of these fingers. The brace 42 is secured at its ends to the fingers 37, and the brace 43 is secured at its ends to the fingers 38. The braces 41, 42 and 43 are longitudinally curved so that these braces sweep rearwardly at their opposite ends from the bar 39 when the weed guard is mounted in operative position on the motor stem, as illustrated in Figure 8.

Split clamps 44 and 45 are secured to the bar 39 at spaced apart locations along this bar for attaching the weed guard directly to the motor stem when the frame 25 is not used.

An elongated flat plate 46 is secured to the outer side of the bar 39 and overlies a portion of this bar and the portions of the fingers secured to the bar 39.

Both of the weed guards herein illustrated will effectively sweep material such as weeds and grass aside from the propeller 13 of the outboard motor so that the propeller will not be fouled by such material. As the fingers are spaced apart and are relatively narrow, the weed guards will not materially increase the drag of the motor.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A weed guard assembly for an outboard motor comprising a flat member of resilient material shaped to constitute a flat loop having its inner side shaped to fit the front side of an outboard motor stem and its outer side longitudinally curved and spaced from said inner side, split clamps secured at spaced apart locations to said inner side for attaching the assembly to a motor stem, a bowed spring secured intermediate its length to one side and bearing at its ends on the other side of said loop, flat eyes secured to said other side and slidably receiving the respectively opposite ends of said spring, guard fingers secured each at one end to the outer side of said loop, and transversely extending braces secured to the outer side of said loop and to said fingers, said fingers being arranged in pairs spaced apart longitudinally of the outer side of said loop with the two fingers of each pair disposed at respectively opposite sides of said outer side and diverging symmetrically from the latter.

WILLIAM W. K. VAN NORT.

REFERENCES CITED

The following references are of record in the file of this patent:

UNITED STATES PATENTS

| Number | Name | Date |
|---|---|---|
| 2,054,374 | Fuller | Sept. 15, 1936 |
| 2,140,099 | Wise | Dec. 13, 1938 |
| 2,319,640 | Sink | May 18, 1943 |
| 2,355,842 | Arado | Aug. 15, 1944 |
| 2,468,890 | Moore | May 3, 1949 |